United States Patent
Lin et al.

(10) Patent No.: US 9,312,784 B2
(45) Date of Patent: Apr. 12, 2016

(54) VARIABLE SWITCHING FREQUENCY POWER SUPPLY APPARATUS

(71) Applicant: Chicony Power Technology Co., Ltd., New Taipei (TW)

(72) Inventors: Sen-Chi Lin, New Taipei (TW); Fu-Sung Chen, New Taipei (TW); Yu-Hao Tung, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 138 days.

(21) Appl. No.: 14/209,091

(22) Filed: Mar. 13, 2014

(65) Prior Publication Data

US 2015/0263642 A1  Sep. 17, 2015

(51) Int. Cl.
*H02J 1/00* (2006.01)
*H02M 7/217* (2006.01)
*H02M 3/335* (2006.01)
*H02M 1/00* (2007.01)

(52) U.S. Cl.
CPC .......... *H02M 7/217* (2013.01); *H02M 3/33507* (2013.01); *H02M 2001/0022* (2013.01)

(58) Field of Classification Search
CPC . H02M 3/28; H02M 3/33569; H02M 3/3376; H02M 3/33507; H02M 3/33592; H02M 3/33523
USPC ............... 363/15–17, 21.02, 98, 21.12–21.18
See application file for complete search history.

(56) References Cited

U.S. PATENT DOCUMENTS

| | | | | |
|---|---|---|---|---|
| 5,012,058 A  * | 4/1991 | Smith | ................. | H02M 3/3376 219/716 |
| 7,667,526 B2 | 2/2010 | Chan et al. | | |
| 8,705,252 B2 * | 4/2014 | Duvnjak | ............. | H02M 1/4258 363/126 |
| 8,729,741 B2 * | 5/2014 | Lai | ......................... | H02J 7/0031 307/125 |
| 2011/0037401 A1* | 2/2011 | Yu | ...................... | H05B 41/2985 315/246 |

FOREIGN PATENT DOCUMENTS

| | | |
|---|---|---|
| TW | I251979 B | 3/2006 |
| TW | M364897 U1 | 9/2009 |
| TW | 201145778 A | 12/2011 |
| TW | I357708 B | 2/2012 |

* cited by examiner

*Primary Examiner* — Nguyen Tran
(74) *Attorney, Agent, or Firm* — Muncy, Geissler, Olds & Lowe, P.C.

(57) ABSTRACT

A variable switching frequency power supply apparatus includes a main transformer, a voltage detection unit, a pulse width modulation control unit and a switch unit. The voltage detection unit is electrically connected to the main transformer. The pulse width modulation control unit is electrically connected to the voltage detection unit. The switch unit is electrically connected to the pulse width modulation control unit and the main transformer. The main transformer transforms an input voltage into an output voltage according to a switching frequency of the switch unit. The voltage detection unit detects the input voltage and then informs the pulse width modulation control unit. The pulse width modulation control unit is configured to control the switching frequency of the switch unit according to a voltage absolute value of the input voltage.

7 Claims, 2 Drawing Sheets

VARIABLE SWITCHING FREQUENCY POWER SUPPLY APPARATUS

BACKGROUND OF THE INVENTION

1. Field of the Invention

The present invention relates to a power supply apparatus, and especially relates to a variable switching frequency power supply apparatus.

2. Description of the Related Art

A power supply apparatus is a very common electronic apparatus. The power supply apparatus supplies power to an external electronic apparatus to drive the external electronic apparatus. Therefore, the power supply apparatus is very important.

A transistor switch electrically connected to a transformer is controlled with a fixed frequency by a pulse width modulation controller of a related art power supply apparatus. Therefore, the root mean square value current and the peak current are larger when the input voltage is low. Low current resistance power components cannot be used. A lot of electric energy becomes thermal energy. The transformer enters the saturation state easily to lost inductance characteristics.

Therefore, the efficiency of the related art power supply apparatus is not good when the input voltage is low.

SUMMARY OF THE INVENTION

In order to solve the above-mentioned problems, an object of the present invention is to provide a power supply apparatus with variable switching frequency.

In order to achieve the object of the present invention mentioned above, the power supply apparatus includes a main transformer, a voltage detection unit, a pulse width modulation control unit and a switch unit. The voltage detection unit is electrically connected to the main transformer. The pulse width modulation control unit is electrically connected to the voltage detection unit. The switch unit is electrically connected to the pulse width modulation control unit and the main transformer. The main transformer transforms an input voltage into an output voltage according to a switching frequency of the switch unit. The voltage detection unit detects the input voltage and then informs the pulse width modulation control unit. The pulse width modulation control unit is configured to control the switching frequency of the switch unit according to a voltage absolute value of the input voltage.

The efficiency of the present invention is to improve the efficiency of the power supply apparatus when the input voltage is low.

DETAILED DESCRIPTION OF THE INVENTION

Figure 1:
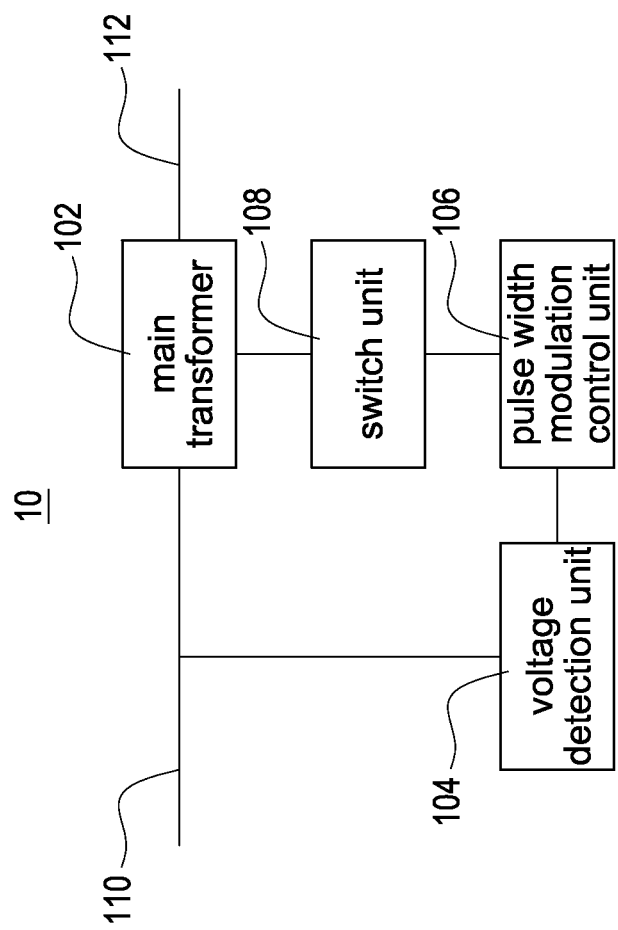
FIG. 1 shows a block diagram of the first embodiment of the variable switching frequency power supply apparatus of the present invention.

FIG. 1 shows a block diagram of the first embodiment of the variable switching frequency power supply apparatus of the present invention. A variable switching frequency power supply apparatus 10 includes a main transformer 102, a voltage detection unit 104, a pulse width modulation control unit 106 and a switch unit 108.

The voltage detection unit 104 is electrically connected to the main transformer 102. The pulse width modulation control unit 106 is electrically connected to the voltage detection unit 104. The switch unit 108 is electrically connected to the pulse width modulation control unit 106 and the main transformer 102.

The main transformer 102 transforms an input voltage 110 into an output voltage 112 according to a switching frequency of the switch unit 108. The voltage detection unit 104 detects the input voltage 110 and then informs the pulse width modulation control unit 106. The pulse width modulation control unit 106 is configured to control the switching frequency of the switch unit 108 according to a voltage absolute value of the input voltage 110.

In a first embodiment, when the voltage absolute value of the input voltage 110 is larger than a third threshold voltage value, the pulse width modulation control unit 106 is configured to control the switching frequency of the switch unit 108, so that the switching frequency of the switch unit 108 is a third frequency.

When the voltage absolute value of the input voltage 110 is not larger than the third threshold voltage value, the pulse width modulation control unit 106 is configured to control the switching frequency of the switch unit 108, so that the switching frequency of the switch unit 108 is a fourth frequency.

Moreover, the third frequency is different from the fourth frequency. The third frequency is smaller than the fourth frequency. The third threshold voltage value is, for example but not limited to, 150 volts. The third frequency is, for example but not limited to, 65 KHz. The fourth frequency is, for example but not limited to, 100 KHz.

Moreover, in a second embodiment, when the voltage absolute value of the input voltage 110 is increasing and is larger than a first threshold voltage value, the pulse width modulation control unit 106 is configured to control the switching frequency of the switch unit 108, so that the switching frequency of the switch unit 108 is a first frequency.

When the voltage absolute value of the input voltage 110 is increasing and is not larger than the first threshold voltage value, the pulse width modulation control unit 106 is configured to control the switching frequency of the switch unit 108, so that the switching frequency of the switch unit 108 is not changed.

When the voltage absolute value of the input voltage 110 is decreasing and is smaller than a second threshold voltage value, the pulse width modulation control unit 106 is configured to control the switching frequency of the switch unit 108, so that the switching frequency of the switch unit 108 is a second frequency.

When the voltage absolute value of the input voltage 110 is decreasing and is not smaller than the second threshold voltage value, the pulse width modulation control unit 106 is configured to control the switching frequency of the switch unit 108, so that the switching frequency of the switch unit 108 is not changed.

Moreover, the first threshold voltage value is different from the second threshold voltage value. The first threshold voltage value is larger than the second threshold voltage value. The first frequency is different from the second frequency. The first frequency is smaller than the second frequency. The first threshold voltage value is, for example but not limited to, 160 volts. The second threshold voltage value is, for example but not limited to, 140 volts. The first frequency is, for example but not limited to, 65 KHz. The second frequency is, for example but not limited to, 100 KHz.

The process of the second embodiment mentioned above is similar to the Hysteresis effect. Therefore, the pulse width modulation control unit 106 avoids changing the switching frequency of the switch unit 108 frequently to protect the components of the variable switching frequency power supply apparatus 10.

Figure 2:
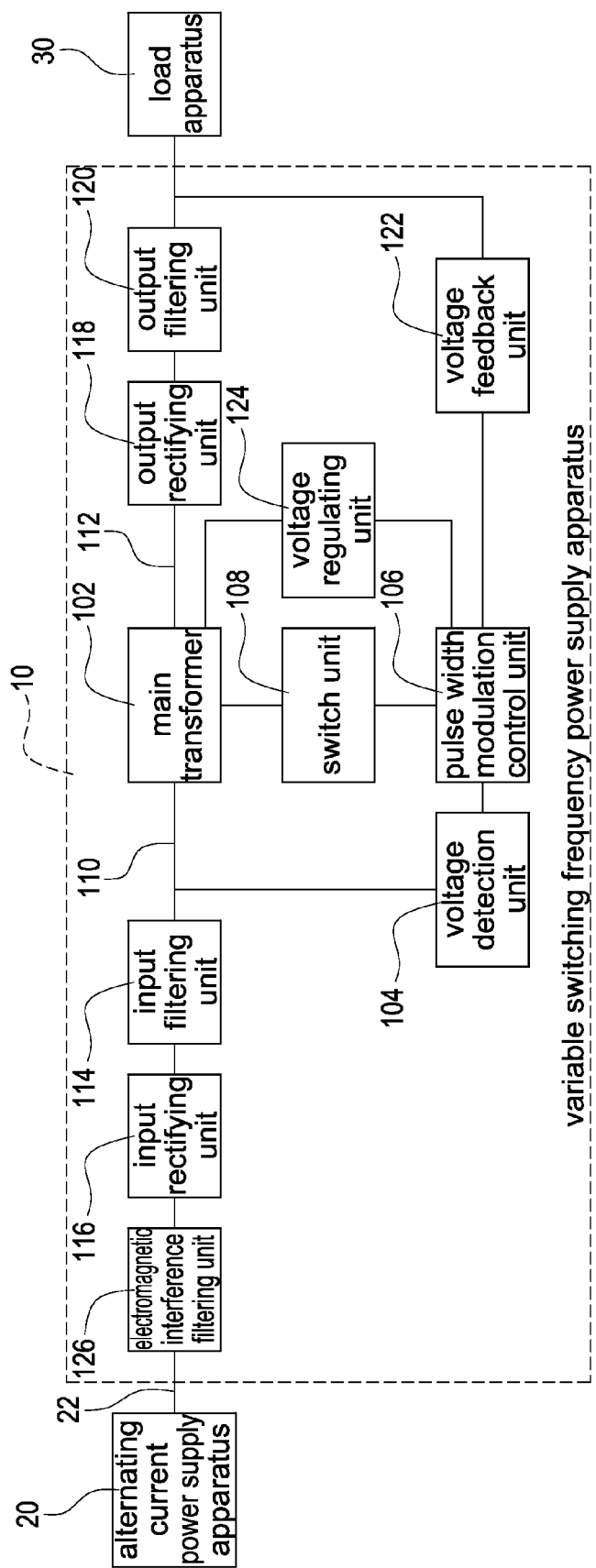
FIG. 2 shows a block diagram of the second embodiment of the variable switching frequency power supply apparatus of the present invention.

FIG. 2 shows a block diagram of the second embodiment of the variable switching frequency power supply apparatus of the present invention. The description for the elements shown in FIG. 2, which are similar to those shown in FIG. 1, is not repeated here for brevity. Moreover, the variable switching frequency power supply apparatus 10 is applied to an alternating current power supply apparatus 20 and a load apparatus 30. The variable switching frequency power supply apparatus 10 further includes an input filtering unit 114, an input rectifying unit 116, an output rectifying unit 118, an output filtering unit 120, a voltage feedback unit 122, a voltage regulating unit 124 and an electromagnetic interference filtering unit 126.

The input filtering unit 114 is electrically connected to the main transformer 102. The input rectifying unit 116 is electrically connected to the input filtering unit 114. The output rectifying unit 118 is electrically connected to the main transformer 102. The output filtering unit 120 is electrically connected to the output rectifying unit 118 and the load apparatus 30. The voltage feedback unit 122 is electrically connected to the output filtering unit 120, the load apparatus 30 and the pulse width modulation control unit 106. The voltage regulating unit 124 is electrically connected to the main transformer 102 and the pulse width modulation control unit 106. The electromagnetic interference filtering unit 126 is electrically connected to the alternating current power supply apparatus 20 and the input rectifying unit 116.

The voltage detection unit 104 is, for example but not limited to, a voltage sampling circuit. An output power 22 of the alternating current power supply apparatus 20 is, for example but not limited to, between 90 volts and 265 volts. The pulse width modulation control unit 106 is, for example but not limited to, a pulse width modulation controller. The switch unit 108 is, for example but not limited to, a transistor switch. The input filtering unit 114 is, for example but not limited to, a filtering capacitor. The input rectifying unit 116 is, for example but not limited to, a bridge rectifier. The output rectifying unit 118 is, for example but not limited to, a diode. The output filtering unit 120 is, for example but not limited to, a filtering capacitor. The voltage feedback unit 122 is, for example but not limited to, a voltage feedback circuit. The voltage regulating unit 124 is, for example but not limited to, a voltage regulating circuit. The electromagnetic interference filtering unit 126 is, for example but not limited to, an electromagnetic interference filter.

The voltage detection unit 104 shown in FIG. 2 is electrically connected to the main transformer 102 and the input filtering unit 114, so that the voltage detection unit 104 detects the input voltage 110 to fetch the voltage absolute value of the input voltage 110. However, the voltage detection unit 104 can be electrically connected to the alternating current power supply apparatus 20 as well, so that the voltage detection unit 104 detects the output power 22 of the alternating current power supply apparatus 20 to fetch the voltage absolute value of the input voltage 110 (the output power 22).

Moreover, the voltage detection unit 104 can be electrically connected to the input rectifying unit 116 and the electromagnetic interference filtering unit 126 as well, or can be electrically connected to the input rectifying unit 116 and the input filtering unit 114.

The present invention includes following features (advantages):

1. The switching frequency of the switch unit 108 is lower when the voltage absolute value of the input voltage 110 (the output power 22) is larger. The switching frequency of the switch unit 108 is higher when the voltage absolute value of the input voltage 110 (the output power 22) is smaller.

2. The root mean square value current and the peak current are decreasing effectively when the switching frequency of the switch unit 108 is higher. Low current resistance power components can be used. The magnetic flux is decreasing, so that the magnetizing inductance can be increasing to improve the efficiency. Or with the same magnetizing inductance, the number of turns of the main transformer 102 can be decreasing to use smaller iron core to decrease the volume.

3. The efficiency of the power supply apparatus is improved when the input voltage is low.

4. The present invention is applicable to the continuous conduction mode.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A variable switching frequency power supply apparatus comprising:
a main transformer;
a voltage detection unit electrically connected to the main transformer;
a pulse width modulation control unit electrically connected to the voltage detection unit; and
a switch unit electrically connected to the pulse width modulation control unit and the main transformer,
wherein the main transformer transforms an input voltage into an output voltage according to a switching frequency of the switch unit; the voltage detection unit detects the input voltage and then informs the pulse width modulation control unit; the pulse width modulation control unit is configured to control the switching frequency of the switch unit according to a voltage absolute value of the input voltage,
wherein when the voltage absolute value of the input voltage is increasing and is larger than a first threshold voltage value, the pulse width modulation control unit is configured to control the switching frequency of the switch unit, so that the switching frequency of the switch unit is a first frequency,
wherein when the voltage absolute value of the input voltage is increasing and is not larger than the first threshold voltage value, the pulse width modulation control unit is configured to control the switching frequency of the switch unit, so that the switching frequency of the switch unit is not changed,
wherein when the voltage absolute value of the input voltage is decreasing and is smaller than a second threshold voltage value, the pulse width modulation control unit is configured to control the switching frequency of the switch unit, so that the switching frequency of the switch unit is a second frequency,
wherein when the voltage absolute value of the input voltage is decreasing and is not smaller than the second threshold voltage value, the pulse width modulation control unit is configured to control the switching frequency of the switch unit, so that the switching frequency of the switch unit is not changed, wherein the first threshold voltage value is larger than the second threshold voltage value; the first frequency is smaller than the second frequency; the pulse width modulation control unit is configured to control the switching frequency of the switch unit by a hysteresis effect.

2. The variable switching frequency power supply apparatus in claim 1, the variable switching frequency power supply apparatus applied to an alternating current power supply apparatus and a load apparatus, the variable switching frequency power supply apparatus further comprising:

an input filtering unit electrically connected to the main transformer; and an input rectifying unit electrically connected to the input filtering unit.

3. The variable switching frequency power supply apparatus in claim 2, further comprising:

an output rectifying unit electrically connected to the main transformer; and an output filtering unit electrically connected to the output rectifying unit and the load apparatus.

4. The variable switching frequency power supply apparatus in claim 3, further comprising:

a voltage feedback unit electrically connected to the output filtering unit, the load apparatus and the pulse width modulation control unit;

a voltage regulating unit electrically connected to the main transformer and the pulse width modulation control unit; and an electromagnetic interference filtering unit electrically connected to the alternating current power supply apparatus and the input rectifying unit.

5. The variable switching frequency power supply apparatus in claim 4, wherein the first threshold voltage value is 160 volts; the second threshold voltage value is 140 volts; the first frequency is 65 KHz; the second frequency is 100 KHz.

6. The variable switching frequency power supply apparatus in claim 5, wherein the voltage detection unit is a voltage sampling circuit; an output power of the alternating current power supply apparatus is between 90 volts and 265 volts.

7. The variable switching frequency power supply apparatus in claim 6, wherein the pulse width modulation control unit is a pulse width modulation controller; the switch unit is a transistor switch; the input filtering unit is a filtering capacitor; the input rectifying unit is a bridge rectifier; the output rectifying unit is a diode; the output filtering unit is a filtering capacitor; the voltage feedback unit is a voltage feedback circuit; the voltage regulating unit is a voltage regulating circuit; the electromagnetic interference filtering unit is an electromagnetic interference filter.

* * * * *